United States Patent [19]

Arfsten et al.

[11] Patent Number: 4,568,578
[45] Date of Patent: Feb. 4, 1986

[54] PROCESS FOR THE PRODUCING OF INDIUM OXIDE-TIN OXIDE LAYERS AND THE RESULTANT COATED SUBSTRATES

[75] Inventors: Nanning J. Arfsten, Bischofsheim; Reinhard Kaufmann, Mainz; Helmut Dislich, Budenheim, all of Fed. Rep. of Germany

[73] Assignee: Schott Glaswerke, Mainz, Fed. Rep. of Germany

[21] Appl. No.: 569,885

[22] Filed: Jan. 11, 1984

[30] Foreign Application Priority Data

Jan. 11, 1983 [DE]  Fed. Rep. of Germany ....... 3300589

[51] Int. Cl.$^4$ .................. B32B 17/06; B05D 3/02; B05D 1/38; C03C 17/25
[52] U.S. Cl. .................................... 428/34; 427/45.1; 427/108; 427/160; 428/336; 428/428; 428/432; 428/697
[58] Field of Search ............... 427/108, 160, 45.1; 428/34, 336, 428, 432, 697

[56] References Cited

U.S. PATENT DOCUMENTS

| | | | |
|---|---|---|---|
| 3,949,259 | 4/1976 | Kostlin et al. | 427/160 X |
| 4,248,687 | 2/1981 | Fan | 427/160 X |
| 4,252,841 | 2/1981 | Kinugawa et al. | 427/108 |
| 4,268,539 | 5/1981 | Nakayama et al. | 427/108 |
| 4,286,009 | 8/1981 | Griest | 427/160 X |
| 4,401,693 | 8/1983 | Frank et al. | 427/160 |

FOREIGN PATENT DOCUMENTS 2056433  3/1981  United Kingdom .

OTHER PUBLICATIONS

Angewandte Chemie, International Edition in English, vol. 10, 1971, No. 6, pp. 363-370.

*Primary Examiner*—James R. Hoffman
*Attorney, Agent, or Firm*—Millen & White

[57] ABSTRACT

A process for the production of transparent, electrically conductive, infrared-reflecting indium oxide-tin oxide layers, especially on glass panes, involves steps wherein the glass panes are dipped into a first solution containing a hydrolyzable silicon compound and hydrolyzable compounds of titanium, zirconium, aluminum, tin or tantalum;

the glass panes are heated up to 450° C. in a moisture-containing atmosphere;
  the initially coated panes are dipped into a second solution containing hydrolyzable compounds of indium and of tin;
  the panes are dried at temperatures below 250° C.; and
  the panes are finally heated up to 550° C. in a reducing atmosphere.

22 Claims, No Drawings

PROCESS FOR THE PRODUCING OF INDIUM OXIDE-TIN OXIDE LAYERS AND THE RESULTANT COATED SUBSTRATES

BACKGROUND OF THE INVENTION

This invention relates to the production of transparent, electrically conductive and infrared-radiation-reflecting indium-tin-oxide layers (ITO layers) using the conventional dipping method. In this process, glass panes are dipped into a solution of hydrolyzable compounds of indium and tin, drawn uniformly out into a steam-containing atmosphere, dried, and hardened under the effect of a reducing gas atmosphere.

ITO layers are of considerable interest on account of the combination of properties they provide, i.e., high electric conductivity, high IR reflection with high solar energy transmission, high transmission in the visible range, ready etching capability using acids, good environmental stability, good scratch resistance, and good adhesion to glass, even in comparison with other layers such as tin oxide, cadmium stannate and thin copper, silver or gold layers between dielectric layers. These layers are inferior to ITO layers with respect to their combination of properties.

Unilateral ITO layers on thin glass, produced by the vacuum method, have become quite extensively popular in the display field (LCD and others). The combination of high solar energy transmission with simultaneously high IR reflection of long wavelength IR radiation is a very desirable property in connection with coatings in the glazing of buildings (insulating glass windows). These properties allow the window to become a passive solar collector. High transmission is desired from the viewpoint of light technology, and almost ideal requirement profiles are met by ITO layers. Such layers do not exist commercially. Other fields of application include solar cells (ITO, CdS, CuS), photocells (ITO, PbS), optical filters, electric heating, antifogging devices and methods, and many others. Those skilled in the art are familiar with the great significance of ITO layers, especially when considering environmental stability as well.

In accordance with the known state of the art, ITO layers are produced by vacuum methods, including sputtering. The expenditure in apparatus is considerable, and the application rate is relatively slow. Therefore, thus far, there exists no large area surface coating method extending over several square meters.

ITO layers are also applied by the spraying and CVD techniques. Layers applied in this way do not exhibit the adequate uniformity required for a window. This is essentially due to the occurrence of various interference colors because of varying thickness. Heretofore, this process has not enabled the production of large-surface coatings, either.

Highly homogeneous layers of unifom thickness can be applied to large glass panes by the dipping method. In this process, the pane is dipped into a solution of hydrolyzable metal compounds, such as, for example, silicic acid esters in alcohol, drawn out at uniform speed, then air-dried, and hardened at 400°–500° C. and thus transformed into a transparent SiO₂ layer.

Although layers can be produced with a plurality of various oxides (H. Schroeder, Oxide Layers Deposited from Organic Solutions, Physics of Thin Films, vol. 5, 1969, Academic Press Inc., New York) and a method exists for the production of defined multicomponent oxides (H. Dislich, Angew. Chem. Internat. Ed. vol. 10, 1971, No. 6: 363–370), heretofore, no solution has been provided for the problem of producing high-conductivity and highly IR-reflecting ITO layers in a dipping procedure, although this has been recognized as a desirable aim.

For example, in U.S. Pat. No. 4,252,841, a dipping process was attempted. In U.S. Pat. No. 4,268,539 as well as British Pat. No. 2,056,433, it was tried by utilizing other methods. Surface resistances of at best only 500 $\Omega/\square$ have been obtained. To provide a useful advance in the art, however, the range of a defined 20–30 $\Omega/\square$ for windows and 10–500 $\Omega/\square$ for displays is necessary. Moreover, for practical exploitability, a parcel of properties must be attained as per the following target data:

| Property | Windows | Displays |
|---|---|---|
| Surface resistance ($\Omega/\square$) | 20–30 | 10–500 |
| IR Reflection at 9.5 $\mu$m (%) | 70–80 | — |
| Residual reflection in visible range (%) | — | <10 |
| Transmission in visible range (%) | >80 | >80 |
| Color reproduction neutral | Yes | Yes |
| Hardness, brass-iron-proof | Yes | Yes |
| Homogeneous layer thickness | Yes | Yes |
| Smooth layers | Yes | Yes |
| Stable against usual cleansers | Yes | Yes |
| Stable against environment, including sun | Yes | — |
| Permits single etching | — | Yes |

According to the state of the art, these requirement profiles are not achieved in the dipping process suitable for large-surface coating. Not even substantial steps toward this direction have become known. However, the dipping method would be the choice selected because it possesses a high degree of reproducibility of properties, and above all because both sides of a glass pane are coated simultaneously and without additional expenditure whereby functional efficiency is considerably enhanced. Thus, in case of displays, in the so-called dual cells, the central pane with its conductive layer on both sides is utilized, and in case of windows, functional efficiency is considerably increased as can be seen from the following data. For an insulating glass window made up of two 6 mm float glass panes (one coated bilaterally) at a spacing of 12 mm, interspace filled with argon, the following values are obtained

| light transmission | L = 83% |
| total energy transmission | G = 74% |
| heat transfer coefficient | k = 1.5 W/m²K° |

The best values for commercially available systems are presently L=69%, G=60%, k=1.5 W/m²K.

The advance in the art attainable with the use of ITO layers is especially striking when employing a window as a passive solar collector. Additionally, the ITO layers produced by the dipping method show long-term stability against weathering, even if one of the two layers faces the outside.

SUMMARY OF THE INVENTION

It is therefore an object of this invention to provide a process for preparing ITO layers by the dipping method and in a quality at least corresponding to that of layers produced by more expensive methods (for example as display layers), but in most cases exceeding such quality (for example as a coating for the glazing of buildings).

Upon further study of the specification and appended claims, further objects and advantages of this invention will become apparent to those skilled in the art.

A substantial advance is provided by this invention in that excellent properties, such as the highest transparency (up to 96% at 550 nm) and IR reflection of >80% (up to 85% at 9.5 μm), can be achieved using layers that are thinner by 100 nm than layers produced according to the state of the art.

This not only gives the advantage of a savings in material especially for the relatively expensive indium, but thin layers are also more compact and more rugged. The primary savings in material however results from the fact itself that ITO layers according to this invention can now be achieved by the dipping method. In this process there is no waste of expensive indium, as compared, for example, with the spraying and CVD processes where a considerable proportion of the material to be applied misses the mark. This also applies to the vacuum methods where, however, the material not disposed on the substrate can be reprocessed. In the process according to this invention spillage can also happen in the filling of a cuvette, but filling is required only extremely rarely becuase the solution can be adjusted in accordance with this invention so that it keeps for longer than a year.

The foregoing objects and advantages have been achieved by providing a process for the production of transparent, electrically conductive, infrared-reflecting indium oxide-tin oxide layers using a dipping method, wherein (a) a substrate is dipped into a first solution containing a hydrolyzable silicon compound and one or more hydrolyzable compounds of titanium, zirconium, aluminum, tin, or tantalum, (b) this substrate is uniformly drawn out into a moisture-containing atmosphere and (c) heated to temperatures of up to maximally 450° C., (d) whereupon this initially coated substrate is dipped into a second solution containing hydrolyzable compounds of indium and of tin, (e) uniformly drawn out into a moisture-containing atmosphere and (f) optionally dried at temperatures of below 250° C., (g) and finally the substrate is heated to temperatures of up to maximally 500° C. in a reducing atmosphere containing steam and optionally up to 3 vol-% of oxygen.

DETAILED DISCUSSION

The invention encompasses, on the one hand, the production of ITO dipping solutions and the layers they enable, as well as the manufacture of dipping solutions for the production of barrier layers affording at the same time an essential improvement in the layer properties of the subsequently applied ITO coating with respect to layer hardness and long-term stability, and, on the other hand, encompasses the associated process parameters to be maintained to obtain defined layer properties.

An absolutely necessary step to attain and maintain a good conductivity and IR reflection on glass having a high alkali content, for example float glass, is the application of a barrier layer to prevent diffusion of alkali metal ions from the basic glass into the subsequently applied ITO layer. Although, in the simplest case, an $SiO_2$ layer could be applied by the dipping method for this purpose, the lifetime of the ITO layers applied thereto is rather limited. According to this invention, a good mechanical and chemical durability of the ITO layer is obtained by producing mixed-oxide barrier layers of $SiO_2$ with oxides of tantalum, zirconium, titanium, aluminum, and tin. Moreover, the invention achieves, using these mixed oxide layers, a marked improvement in all important properties of the ITO layer, especially IR reflection. Thus, charge carrier concentrations of $5.6 \times 10^{20}$ [cm$^{-3}$], specific conductivities of 5,800 [$\Omega^{-1}$cm$^{-1}$], and mobilities of 60 [cm$^2$V$^{-1}$sec$^{-1}$] are obtained, corresponding to the best layers manufactured by other methods. The fact that this is made possible by means of the dipping method, which is amenable to large-surface coatings and yields very homogeneous layers, represents a considerable advance in the art.

The mixed-oxide layers, the great advantage of which resides in improving and maintaining good properties of the ITO layer, are obtained by dissolving hydrolyzable compounds of silicon and one or more of tantalum, zirconium, titanium, aluminum, and/or tin, dipping the glass pane into this solution, e.g., for 0.5-5 minutes at a temperature of 20°-30° C., drawing the pane uniformly out into a steam-containing atmosphere, drying the pane, and hardening it at an elevated temperature of up to 550° C., usually 400°-450° C. Suitable hydrolyzable compounds include salts of organic or inorganic acids or alkoxides of all aforementioned elements, for example, acetates, nitrates, halogenides, $C_1$-$C_6$-alkoxides, e.g., of methanol or ethanol. Typically, the silicon compound will be a silicic acid $C_1$-$C_4$-alkyl ester, e.g., a methyl or ethyl ester. The choice of the composition is extensively arbitrary; it depends on the case under consideration and can be optimized in a simple series of routine tests by varying the usual parameters such as concentration, identity of the salt or salts used and/or of the metal(s) used.

Usually the concentration of this silicon compound is 0.1–1M and of the total of the other compound(s) of Ta, Zn, Ti, Al and/or Sn is 0.1–1M. The barrier layer solution further contains 0.05–12 wt% of water, preferably distilled water, rest alcohol, preferably ethanol, and 0.1–7 wt% of an acid preferably concentrated acetic acid. The mixture is preferably prepared by adding all ingredients together except for the hydrolyzable salt of Ti, Zr, Al, Sn and/or Ta and allowed to stand at room temperature for 6–72 hours. The order of mixing preferably is: silicon compound, part of the ethanol, the water and then the acid. After the standing period, the other metal salt is added followed by the remaining ethanol.

The initial substrate, of course, should be cleaned conventionally prior to the initial dipping step. After the latter, it is simply lifted out of the solution at a uniform rate (e.g., 0.1-2 cm/sec) into an atmosphere containing 1-20 g/m$^3$ of steam at a temperature of 20°-30° C. for a period of time of 0.5-5 min.

Thereafter, it is dried at 200°-250° C. for 1-15 minutes which effects incomplete hardening or less preferably it is fully hardened by heating to the hardening temperatures mentioned above for 1-10 minutes in a normal furnace air atmosphere. The reactions by which the two layers (barrier and ITO) influence each other in a positive manner are unknown. But it is an essential optional feature of this invention that this reaction can be enhanced by incompletely hardening the first-applied base layer at only 200°-250° C. as described above and, then applying the ITO layer, and hardening both layers together as a finishing step at e.g., 400°-450° C.

The dipping process in the production of the barrier layers involves a maximally careful, adapted climatization with respect to temperature and atmospheric humidity as described above. Besides achieving improved properties, this also affords an advantage from the viewpoint of economy in that the high-temperature stage need only be passed through once in the latter preferred embodiment. This procedure is novel, and the effect surprising, because a person skilled in the art would have to harbor considerable doubts against dipping the substrate into the ITO solution because of the known instability of not-completely-hardened layers—i.e., layers which are not as yet purely oxidic—due to the possibility of partial dissolution into and contamination of the ITO solution.

The ITO solution must have long-term stability because of the high costs of indium. To produce the solution, hydrolyzable compounds of indium and tin, such as salts of organic or inorganic acids or alkoxides, as described above, e.g., acetates, halogenides, nitrates, methoxides, ethoxides or propoxides, are dissolved in solvents or solvent mixtures, e.g., alcohols especially methanol, ethanol, propanol, optionally with the addition of dilute acetic acid. The selection of the solvent depends on the choice of indium and tin starting compounds and can be optimized in simple preliminary tests. The indium-tin ratio is preferably 5.2-9.8 atom-% Sn in $In_2O_3$-$SnO_2$, to achieve a desirable high conductivity and IR reflection. In the solution, the concentration of In salt is usually 5-20%, and of Sn salt as above. The solution can also contain, besides the solvent, additives such as, for instance acetic acid, acetyl acetone and other chelating agents.

The initially coated glass pane, treated at 450° C. or preferably at 200°-250° C., is then dipped into this solution for 0.5-5 min., drawn out uniformly, e.g., at rates of 0.1-2 cm/sec into a steam-containing atmosphere, e.g., under the conditions described above, dried intermediately, e.g., at 200°-250° C., which is an optional step, and treated in a defined, reducing gas atmosphere at temperatures of up to 550° C., e.g., 400°-450° C. The substrate temperature upon dipping into the ITO solution is 20°-30° C. The solution temperature is usually 20°-30° C. The optional drying step is conducted for 1-15 minutes.

Reducing treatments of ITO layers, i.e., those produced in a spraying process, is known from DOS 1,955,434. This treatment increases conductivity and IR reflection. The aforementioned DOS points out expressly that the residual oxygen content of the reducing gas atmosphere must not be higher than $10^{-2}$ vol-%, because otherwise a lessening of IR reflection occurs. However, this requires extensively sealed furnaces entailing, in a customary continuous process, a quite considerable investment cost and makes the process more difficult and slower.

It has been discovered surprisingly that it is possible according to this invention to operate with commercially available reduction gases, to permit a high oxygen proportion of up to 3 vol-%, and as a consequence thereof to be able to operate with curing furnaces which are not carefully sealed. According to this invention, conventional reducing gases are employed, e.g., the customary shielding gas (nitrogen:hydrogen 90:10) with residual oxygen contents of up to 3 vol%, e.g., 0.1-2 vol-% or 0.2-2 vol%, and permissible, normally present traces of water. Other conventional reducing gases can also be used, e.g., those mentioned in DOS 1,955,434.

The reducing atmosphere also contains trace amounts of steam. Thus, the gas can comprise nitrogen, hydrogen, oxygen and trace amounts of water.

These relatively high oxygen contents, however, do entail an additional problem, but one which is solved by the present invention in a preferred embodiment. At temperatures of >400° C., a significant portion of oxygen can react with hydrogen on the hot furnace walls to form water, thus constantly altering the gas composition. These are effects that are greatly influenced by catalytic effects. However, by employing a steel of the type St 4724 as a furnace wall material, these reactions are suppressed and occur to a marked extent only at temperatures of >550° C. The temperature required for curing the ITO layer lies below this value. It is also possible to employ other furnace materials which are catalytically inactive for $O_2$ and $H_2$ at the heating temperatures, e.g., silica glass (quartz), and, e.g., for the latter to heat the coated glass pane through the silica glass with shortwave radiators. With this procedure, the temperature of the furnace wall material remains considerably below the temperature of the coated glass pane. During cooling, the ITO pane is left in the reducing gas atmosphere down to 200° C., preferably.

A wide variety of substrates are applicable for this invention, e.g., comprising glass, glass ceramics, ceramics, and metals.

With the above-described mode of operation of this invention, layers are obtained having IR reflections of up to 85% at 9.5 μm, transmission in the visible range at 550 nm of up to 96%, and surface resistances of below 20 $\Omega/\square$. The specific conductivity of such layers lies at 1,000-5,800 $[\Omega^{-1}cm^{-1}]$, the charge concentration is 3 to $6 \times 10^{20} [m^{-3}]$, and the mobility values range at 10-60 $[cm^2V^{-1}sec^{-1}]$. The respectively desired layer quality, for example as mentioned above for windows or displays, can be regulated without altering the solution or the process, i.e., by way of the layer thickness. This is—as is known—inter alia, layer thickness can be altered as a function of the drawing rate during emergence from the dipping bath. This simple possibility for variation presents a considerable advantage of the process according to this invention. In general, thinner layers are of higher quality. Barrier layer thicknesses generally are 20-200 nm and ITO layer thicknesses generally are 20-200 nm.

Particularly preferred coated substrates of this invention include window panes with an indium oxide-tin oxide layer and having the following properties:

| | |
|---|---|
| transmission (550 nm) | $\geq 90\%$ |
| reflection (9.5 μm) | $\geq 80\%$ |
| coating properties with a coating thickness of 100 nm: | |
| surface resistance | 25 $[\Omega/\square]$ |
| conductivity | 5,800 $[\Omega^{-1}cm^{-1}]$ |
| charge carrier concentration | $5.6 \times 10^{20} [cm^{-3}]$ |
| mobility | 60 $[cm^2/V\ sec]$, | and glass panes having an indium oxide-tin oxide display layer and having the following coating properties:

| | |
|---|---|
| coating thickness | 40 [nm] |
| surface resistance | 70 $[\Omega/\square]$ |
| conductivity | 1,700 $[\Omega^{-1}cm^{-1}]$ |
| mobility | 30 $[cm^2/V\ sec]$ |
| charge carrier concentration | $3.5 \times 10^{20} [cm^{-3}]$ |
| transmission (of pane) (550 nm) | 96%. |

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

Preparation of a Barrier Layer Solution to be hardened at (450° C.)

25 ml of silicic acid tetramethyl ester, 200 ml of ethanol, 25 ml of distilled water, and 2.5 ml of concentrated acetic acid are combined in the indicated sequence and thoroughly mixed. The mixture is allowed to stand overnight at room temperature. Then $ZrOCl_2$, dissolved in ethanol, is added to the mixture (g $SiO_2$:g $ZrO_2$=2:1) and filled up to 500 ml with ethanol.

EXAMPLE 2

Preparation of a Barrier Layer Solution to be hardened at (250° C.)

25 ml of silicic acid tetramethyl ester, 100 ml of ethanol, 40 ml of distilled water, and 2.7 ml of concentrated acetic acid are combined in the sequence indicated and thoroughly mixed. The mixture is allowed to stand at room temperature for 72 hours. Thereafter titanium butylate, dissolved in ethanol, is added to the mixture and the latter is filled up with ethanol to 400 ml.

EXAMPLE 3

Production of a Barrier Layer

A carefully cleaned float glass pane is dipped (a) into a solution according to Example 1, or (b) into a solution according to Example 2, and drawn out at a rate of 0.6 cm/sec into an atmosphere which contains steam at >7 g/m$^3$. A brief drying step is conducted at 250° C., and the pane stemming from (a) is heated for 5 minutes at 450° C., and the pane stemming from (b) is heated for 5 minutes to 250° C. Both layers are coated with ITO in accordance with Example 6.

EXAMPLE 4

Preparation of an ITO Solution 95 g of indium(III) isopropylate is combined under agitation with 100 ml of isopropanol and with 4.8 g of tin(IV) buytlate. Then 6 ml of acetylacetone is added, and the mixture is diluted with ethanol to a total of 500 ml of solution.

EXAMPLE 5

Preparation of an ITO Solution 65 g of indium(III) nitrate is dissolved in ethanol and combined with 3.1 g of $SnCl_4 \times 5H_2O$, likewise dissolved in ethanol; thereafter the solution is diluted with ethanol to a total of 500 ml.

EXAMPLE 6

Production of an ITO Layer

The panes, initially coated in accordance with Example 3 by procedures (a) or (b) are dipped into a solution according to Examples 4 and 5, respectively, drawn out at a rate of 0.8 cm/sec into an atmosphere containing >10 g/m$^3$ of steam, dried for 5 minutes at 250° C., and heated in a furnace of St 4724 for 15 minutes to 450° C. in a reducing gas atmosphere (gas composition: $N_2$:$H_2$=90:10+0.1-3 vol-% $O_2$), allowed to cool in the reducing gas atmosphere to 200° C., and withdrawn from the furnace. The ITO layer exhibits the following typical properties:

| | |
|---|---|
| layer thickness [nm] | 100 |
| surface resistance [$\Omega$/□] | 25 |
| specific conductivity [$\Omega^{-1}cm^{-1}$] | 5,800 |
| mobility [cm$^2$/V sec] | 60 |
| charge carrier concentration [cm$^{-3}$] | 5.6 × 10$^{20}$ |
| reflection at 9.5 $\mu$m (%) | $\geq$80% |
| transmission at 550 nm (%) | >90% |
| color reproduction index | >96 |
| hardness | ~iron-hard |

EXAMPLE 7

Production of an ITO Layer

The process of Example 6 is analogously conducted, except that the drawing rate is 0.3 cm/sec. The ITO layer has the following properties:

| | |
|---|---|
| layer thickness [nm] | 40 |
| surface resistance [$\Omega$/□] | 70 |
| specific conductivity [$\Omega^{-1}cm^{-1}$] | 1,700 |
| mobility [cm$^2$/V sec] | 30 |
| charge carrier concentration [cm$^{-3}$] | 3.5 × 10$^{20}$ |
| transmission at 550 nm (%) | $\geq$96% |

Analysis of Stability of ITO Layers

I Layers according to Examples 6 and 7 were heated to 150° C. for 24 hours. No change in surface resistance could be observed.

II Layers according to Examples 6 and 7 were stored in distilled $H_2O$ at 50° C. for one year without any changes in the layer being observed. Also the surface resistance remained unchanged during this time.

III Layers according to Examples 6 and 7 were boiled in distilled $H_2O$ for 100 hours. No change in the layers could be observed.

IV Layers according to Examples 6 and 7 were exposed to a changing climate according to DIN 52 344. No layer changes could be observed.

V Layers according to Examples 6 and 7 were stored at room temperature for 24 hours in 1% strength $H_2SO_4$. No layer changes could be observed.

VI Layers according to Examples 6 and 7 were stored at 50° C. for 5 hours in a steam-containing $SO_2$ atmosphere. No attack on the layers could be observed after this time.

VII Layers according to Examples 6 and 7 were subjected to the 4,900 hour "Xenotest" (xenon radiator XE 1500) (1,500 W, filter KG-3, distance 10 cm). No alteration of the layers could be observed.

VIII Layers according to Examples 6 and 7 were exposed to outside weathering conditions for 2 years:

(x) Industrial climate (Rhein-Main area): No change in the layers after 2 years.

(xx) Non-industrial Mediterranean climate (Ibiza): No change in the layers after 2 years.

EXAMPLE 8

Insulating Glass with ITO

A layer produced according to Example 6, installed in an insulating glass, resulted in the following data for the window system.

| System: | | |
|---|---|---|
| Float glass 6 mm | 12 mm Spacing Gas = argon | Float glass 6 mm ITO-Coated |
| Light transmission (%) | | 83 |
| Color reproduction index | | 97 |
| Total energy transmission (%) | | 74 |
| k (W/m$^2$K) | | 1.8 |
| k$^+$ (W/m$^2$K) taking bilateral coating into account | | 1.5 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of transparent, electrically conductive, infrared-reflecting indium oxide-tin oxide layers on a substrate, comprising,
   (a) dipping the substrate into a first solution containing a hydrolyzable silicon compound and a hydrolyzable compound of titanium, zirconium, aluminum, tin, tantalum, or a mixture thereof;
   (b) uniformly drawing the substrate out from the first solution into a moisture-containing atmosphere;
   (c) heating it at a temperature of up to 450° C. which is effective to dry and harden the resultant layer deposited on the substrate;
   (d) dipping the initially coated substrate into a second solution contaning a hydrolyzable compound of indium and a hydrolyzable compound of tin;
   (e) uniformly drawing the substrate out from the second solution into a moisture-containing atmosphere;
   (f) heating the substrate at a temperature up to 550° C. in a reducing atmosphere containing steam and 0 to 3 vol-% of oxygen, the temperature being effective to essentially fully dry and harden the layer deposited in step (e) and effect a reduction thereof via the reducing atmosphere.

2. A process of claim 1 further comprising (f) drying the substrate at a temperature up to 250° C. effective to dry and incompletely harden the layer deposited in step (e), after it is drawn out from the second solution into the moisture-containing atmosphere and before it is heated in the reducing atmosphere.

3. A process of claim 1, wherein the substrate is a glass pane.

4. A process of claim 3, wherein the pane is of an alkali-containing glass.

5. A process of claim 4, wherein the substrate is a float glass pane.

6. A process of claim 1, wherein the hydrolyzable silicon compound in the first dipping solution is a silicic acid alkyl ester, and the hydrolyzable compound of titanium, zirconium, aluminum, tin or tantalum is a salt thereof of an inorganic or organic acid or an alkoxide thereof.

7. A process of claim 1, wherein, in step (c), the substrate is heated to a temperature of up to 250° C.

8. A process of claim 1, wherein in the second solution, the hydrolyzable compounds of indium and of tin are salts of inorganic or organic acids or alkoxides.

9. A process of claim 1, wherein the hydrolyzable compounds in both dipping solutions are methoxides, ethoxides or propoxides thereof and that of silicon is a silicic acid methyl or ethyl ester.

10. A process of claim 1, wherein in the second dipping solution the content of Sn is 5.2–9.8 atom-%, based on $In_2O_3$-$SnO_2$.

11. A process of claim 1, wherein step (f) is conducted in a reducing gas atmosphere comprising nitrogen, hydrogen, oxygen, and water.

12. A process of claim 11, wherein the ratio of $N_2$:$H_2$ in said reducing gas atmosphere of step (f) is 90:10 and the oxygen content is 0.2–2.0 vol-%.

13. A process of claim 1, wherein step (f) is conducted in a system which is not hermetically sealed.

14. A process of claim 1, wherein step (f) is conducted in a furnace whose walls are non-catalytic to mixtures of $H_2$ and $O_2$ at the temperature of step (f).

15. A process of claim 14, wherein said furnace walls comprise St 4724.

16. A process of claim 14, wherein said furnace walls comprise quartz glass, and step (f) comprises heating the substrate through these walls by means of effective short-wave radiation.

17. A substrate having a high alkali content, coated with an indium oxide-tin oxide layer and an intermediate barrier layer, and which is prepared by the process of claim 1.

18. A substrate of claim 17 which is a float glass pane.

19. An insulating float glass window, comprising two glass panes sealing a closed space therebetween, wherein the pane to face the closed space is bilaterally coated with an indium oxide-tin oxide layer and an intermediate barrier layer, and which is prepared by the process of claim 1.

20. An insulating float glass window of claim 19, wherein said coated pane has the following properties:

| | |
|---|---|
| transmission (550 nm) | ≧90% |
| reflection (9.5 μm) | ≧80% |
| layer properties (corresponding to those of a coating thickness of 100 nm: | |
| surface resistance | about 25 [Ω/□] |
| conductivity | about 5,800 [Ω$^{-1}$cm$^{-1}$] |
| charge carrier concentration | about 5.6 × 10$^{20}$ [cm$^{-3}$] |
| mobility | about 60 [cm$^2$/V sec]. |

21. A float glass window pane coated on both sides with an indium oxide-tin oxide layer, and an intermediate barrier layer comprising a mixed oxide of $SiO_2$ with at least one oxide of Ta, Zr, Ti, Al or Sn and having the following properties:

| | |
|---|---|
| transmission (550 nm) | ≧90% |
| reflection (9.5 μm) | ≧80% |
| layer properties (corresponding to those of a coating thickness of 100 nm: | |
| surface resistance | about 25 [Ω/□] |
| conductivity | about 5,800 [$\Omega^{-1}cm^{-1}$] |
| charge carrier concentration | about $5.6 \times 10^{20}$ [$cm^{-3}$] |
| mobility | about 60 [$cm^2$/V sec]. |

22. A float glass pane with an indium oxide-tin oxide layer and an intermediate barrier layer comprising a mixed oxide of $SiO_2$ with at least one oxide of Ta, Zr, Ti Al or Sn, and having the following properties:

| | |
|---|---|
| coating thickness | about 40 [nm] |
| surface resistance | about 70 [Ω/□] |
| conductivity | about 1,700 [$\Omega^{-1}cm^{-1}$] |
| mobility | about 30 [$cm^2$/V sec] |
| charge carrier concentration | about $3.5 \times 10^{20}$ [$cm^{-3}$] |
| transmission (of pane) (550 nm) | about 96%. |

* * * * *

UNITED STATES PATENT AND TRADEMARK OFFICE
CERTIFICATE OF CORRECTION

PATENT NO. : 4,568,578
DATED : February 4, 1986
INVENTOR(S) : Nanning J. Arfsten et al It is certified that error appears in the above-identified patent and that said Letters Patent is hereby corrected as shown below:

Claim 1, line 19: Change "f" to --g--.
Claim 11, line 1: Change "f" to --g--.
Claim 12, line 2: Change "f" to --g--.
Claim 13, line 1: Change "f" to --g--.
Claim 14, line 1: Change "f" to --g--.
Claim 14, line 3: Change "f" to --g--.
Claim 16, line 2: Change "f" to --g--.

Signed and Sealed this

Eighth Day of July 1986

[SEAL]

Attest:

DONALD J. QUIGG

Attesting Officer

Commissioner of Patents and Trademarks